United States Patent
Gandhi et al.

(10) Patent No.: US 7,718,562 B2
(45) Date of Patent: May 18, 2010

(54) PEROVSKITE CATALYST SYSTEM FOR LEAN BURN ENGINES

(75) Inventors: Haren S Gandhi, West Bloomfield, MI (US); Jun (John) Li, Canton, MI (US); Ronald Gene Hurley, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/446,333

(22) Filed: Jun. 2, 2006

(65) Prior Publication Data

US 2006/0223694 A1  Oct. 5, 2006

Related U.S. Application Data

(62) Division of application No. 10/065,498, filed on Oct. 24, 2002, now Pat. No. 7,071,141.

(51) Int. Cl.
*B01J 23/40* (2006.01)
*B01J 23/58* (2006.01)

(52) U.S. Cl. .............. 502/66; 502/60; 502/102

(58) Field of Classification Search .......... 502/60, 502/66, 102
See application file for complete search history.

(56) References Cited

U.S. PATENT DOCUMENTS

| | | | |
|---|---|---|---|
| 4,024,706 A | 5/1977 | Adawi et al. | |
| 4,237,032 A | 12/1980 | Evans et al. | |
| 4,321,250 A | 3/1982 | Hart | |
| 5,380,692 A | 1/1995 | Nakatsuji et al. | |
| 5,622,680 A | 4/1997 | Monceaux et al. | |
| 5,977,017 A | 11/1999 | Golden | |
| 6,395,675 B1 * | 5/2002 | Suga et al. | 502/326 |
| 6,569,803 B2 | 5/2003 | Takeuchi | |
| 6,696,031 B1 * | 2/2004 | Twigg et al. | 423/212 |

FOREIGN PATENT DOCUMENTS

| | | |
|---|---|---|
| EP | 0 941 757 | 9/1999 |
| JP | 6-304449 | 11/1994 |
| JP | 8-217461 | 8/1996 |
| JP | 8-229355 | 9/1996 |

* cited by examiner

*Primary Examiner*—Jessica L. Ward
*Assistant Examiner*—Erin B Saad
(74) *Attorney, Agent, or Firm*—Damian Porcari; Brooks Kushman P.C.

(57) ABSTRACT

A catalyst system for use with an internal combustion engine to provide emissions reductions under lean and stoichiometric operating conditions. The catalyst system comprises a first catalyst comprised of a newly developed Perovskite-based formulation having an $ABO_3$ crystal structure designed to bring the precious metal and NOx trapping elements close together. The first catalyst acts primarily to maximize the reduction of emissions under lean operating conditions. The catalyst system also comprises a second catalyst comprised of precious metals which acts primarily to maximize the reduction of emissions under stoichiometric conditions.

4 Claims, 3 Drawing Sheets

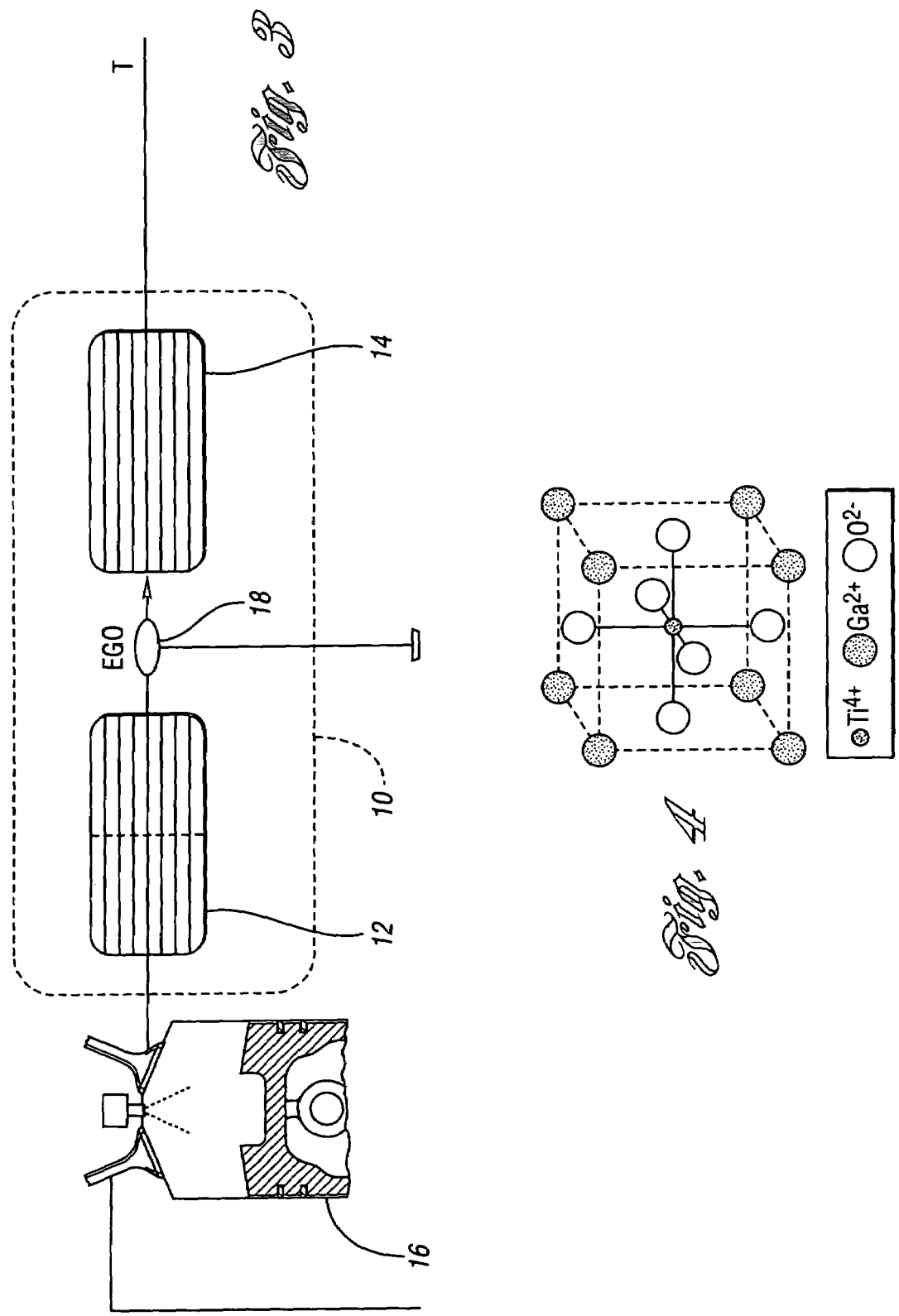

PEROVSKITE CATALYST SYSTEM FOR LEAN BURN ENGINES

CROSS-REFERENCE TO RELATED APPLICATIONS

This application is a divisional of U.S. application Ser. No. 10/065,498 filed Oct. 24, 2002, now issued as U.S. Pat. No. 7,071,141.

BACKGROUND OF THE INVENTION

1. Field of the Invention

The present invention is directed to a catalyst system for use with internal combustion engines to oxidize hydrocarbons, carbon monoxide and reduce nitrogen oxides in an exhaust gas when the engine is operated at both lean and stoichiometric air/fuel ratios. More particularly, the catalyst system of this invention includes two catalysts. The first catalyst is designed specifically to optimize the reduction of noxious emissions under lean conditions. This first catalyst includes a new Perovskite-based formulation designed to achieve close proximity between precious metal and NOx binding elements.

The second catalyst is designed specifically to maximize the reduction of HC, CO and NOx under stoichiometric operations and to treat any breakthrough NOx emissions from the first catalyst. This second catalyst contains precious metals and may optionally include BaO.

2. Background Art

Catalysts have long been used in the exhaust systems of automotive vehicles to convert carbon monoxide, hydrocarbons, and nitrogen oxides (NOx) produced during engine operation into nonpolluting gases including carbon dioxide, water and nitrogen. When a gasoline-powered engine is operated at a stoichiometric or slightly rich air/fuel ratio, i.e., between about 14.6 and 14.4, catalysts containing precious metals like platinum, palladium and rhodium are able to efficiently convert all three gases simultaneously. Typically, such catalysts use a relatively high loading of precious metal to achieve the high conversion efficiency required to meet the stringent emission standards of many countries. Because of the high cost of the precious metals, these catalysts are expensive to manufacture.

To improve vehicle fuel efficiency and lower $CO_2$ emissions, it is preferable to operate an engine under lean conditions. Lean conditions are air/fuel mixtures greater than the stoichiometric mixture (an air/fuel mixture of 14.6), typically air/fuel mixtures greater than 15. While lean operation improves fuel economy, operating under lean conditions increases the difficulty in treating some polluting gases, especially NOx.

For some catalysts, if the air/fuel ratio is lean even by a small amount, NOx conversion is significantly reduced. One way to provide air/fuel control is through the use of a HEGO (Heated Exhaust Gas Oxygen) sensor to provide feedback to the control systems. HEGO sensors, however, over time develop a lean bias as a result of poisoning. Accordingly, even with a HEGO sensor it is important to have a catalyst that can maximize the reduction of NOx emission under lean conditions.

To maximize NOx reduction under lean operating conditions, a lean NOx trap is often used. The inclusion of a NOx trap enhances the reduction of NOx while the engine is operated under lean conditions. The NOx trap functions in a cyclic manner. When the NOx trap reaches the effective storage limit, the engine is operated under normal or rich conditions to purge the NOx trap. After the NOx trap has been purged, the engine can return to lean operation.

However, in addition to problems associated with thermal stability and sulfur tolerance, lean NOx traps (LNT) have the following two known problems: (1) a problem referred to as "NOx breakthrough", the breakthrough of NOx during the NOx trap transition from the lean to the rich cycle; and (2) a reduction in fuel economy that results from frequent purges during the rich cycle. Test results depicted in FIG. 2 shows this NOx breakthrough for LNTs with different oxygen storage capacity (OSC). This total NOx breakthrough has been found to be greater than 73% of the total NOx emitted during the operation of a lean NOx trap.

FIG. 2 also shows the effects of oxygen storage capacity on NOx breakthrough of a lean NOx trap during the lean-to-rich transition. LNT L, which has the highest OSC, results in the largest amount of NOx breakthrough, while the lower the OSC (from LNT M down to LNT N), the lower the amount of NOx breakthrough. It is believed that NOx breakthrough during the lean-rich transition occurs due to the exothermic heat generated from the oxidation of reductants, CO, HC and $H_2$, by the oxygen released from the oxygen storage material (see FIG. 2)—the temperature rise can be as high as 80-100° C.

With regard to the fuel economy penalty, this is believed to be the result of high oxygen storage capacity of the lean NOx trap, low NOx trapping capacity, and/or high exhaust flow rate. The OSC requires additional reductants (i.e., fuel) to reduce the oxygen storage materials during each lean-to-rich transition, while the low NOx trapping capacity requires that the frequency of purges be increased.

The present invention avoids the cost and complexity of the NOx trap and the reduced fuel economy from frequent NOx trap purging by systematically reducing the amount of NOx during engine operation, even under lean conditions.

To solve the above problems, the present invention provides a new catalyst system comprising two catalysts that can treat all exhaust emissions, CO, HC and NOx under both stoichiometric and lean conditions. In particular, the forward catalyst uses a newly developed Perovskite-based formulation which achieves the requisite close proximity between precious metal and NOx binding elements.

The closest known prior art includes modified three-way catalysts. For example, U.S. Pat. No. 4,024,706, incorporated herein by reference, teaches a method of enlarging the air/fuel ratio over which a catalyst operates by including an oxygen storage material. The method involves controlling the air/fuel ratio of the fuel mixture being burned by the engine such that the ratio is transferred into equal amounts going to the rich and lean side of a stoichiometric condition as previously described. The use of an oxygen storage material, however, is believed to result in NOx breakthrough, which increases NOx emissions rather than reducing them.

U.S. Pat. No. 5,977,017 teaches a Perovskite-type catalyst that consists mainly of a metal oxide composition. The metal oxide composition is represented by the general formula:

$A_{a-x}B_xMO_b$, where

A is a mixture of elements originally in the form of a single phase mixed lanthanides collected from bastnasite;

B is a divalent or monovalent cation;

M is at least one element selected from the group consisting of elements of an atomic number from 22-30, 40-51, and 73-80;

a is 1 or 2;

b is 3 when a is 1 or b is 4 when a is 2; and x is between 0 and 0.7.

This general Perovskite structure, however, is not designed to maximize NOx storing and releasing functions—by providing the requisite close proximity between the precious metal and the NOx-binding element. In contrast, the newly developed Perovskite structure of this invention is specifically designed to maximize NOx storage and release.

U.S. Pat. No. 4,321,250 also teaches a Perovskite-type catalyst having a $ABO_3$ crystal structure with about 1 to 20 percent of the B cation sites occupied by Rh ions and the remainder of the B cation sites occupied by ions consisting essentially of cobalt and the A cation sites occupied by lanthanide ions of atomic number 57 to 71 and ions of at least one metal of groups IA, IIA or IVA of the period table having an ionic radii of about 0.9 A to 1.65 A and proportioned so that no more than 50 percent of the cobalt ions are tetravalent and the remaining cobalt ions are trivalent. This composition generally represents Perovskite catalysts that were useful to produce hydrogen in steam reformers.

The use of such types of Perovskite catalysts as an automotive catalyst or their use in combination with other catalysts to produce a NOx tolerant catalyst was not known prior to this invention.

SUMMARY OF THE INVENTION

The present invention is directed to a catalyst system for use with an internal combustion engine. In broad terms, the catalyst system of this invention is designed specifically to maximize reduction of NOx emissions during lean exhaust conditions. The catalyst system can be a single catalyst or a combination of two or more catalysts. Whether one catalyst is used or more than one, the catalyst system is designed to maximize reduction of NOx emissions under lean conditions, and maximize the reduction of HC, NOx and CO emissions under stoichiometric conditions.

More specifically, this invention relates to a new Perovskite formulation for a catalyst to be used in a catalyst system that maximizes the reduction of HC, CO, and NOx under both stoichiometric and lean operating conditions. This new Perovskite-based formulation is to be used in the forward catalyst of a catalyst system, which also uses a downstream catalyst, wherein the forward catalyst is used primarily to reduce emissions under lean operating conditions, and wherein the downstream catalyst is designed primarily to reduce emissions under stoichiometric conditions. It is believed that the newly designed Perovskite-based forward catalyst is optimized for reducing emissions under lean operating conditions by achieving close proximity between the precious metal and NOx-binding elements, such as barium, magnesium and potassium.

We have found that a catalyst system of this construction and composition is capable of oxidizing hydrocarbons and carbon monoxide while also reducing NOx during systematic operation under lean conditions. Accordingly, this invention provides combined treatment of emissions of engines operated under both stoichiometric conditions and lean burn conditions, and provides excellent thermal stability and the resulting metal dispersion eliminates NOx breakthrough during the lean to rich transition. This and other aspects of the invention will be described in detail below.

BRIEF DESCRIPTION OF THE DRAWINGS

FIG. 3 is a schematic view of a catalyst system that incorporates the present invention, showing two catalysts and an EGO sensor positioned therebetween to maximize the treatment of emissions both under stoichiometric operation and under stratified-charged lean conditions;

FIG. 4 is a schematic diagram of the Perovskite crystal structure;

DETAILED DESCRIPTION OF THE PREFERRED EMBODIMENT(S)

Demands for improved fuel economy and lower $CO_2$ emissions have encouraged engine manufacturers to increase the air/fuel ratio above 14.7—above stoichiometric conditions.

Figure 1:
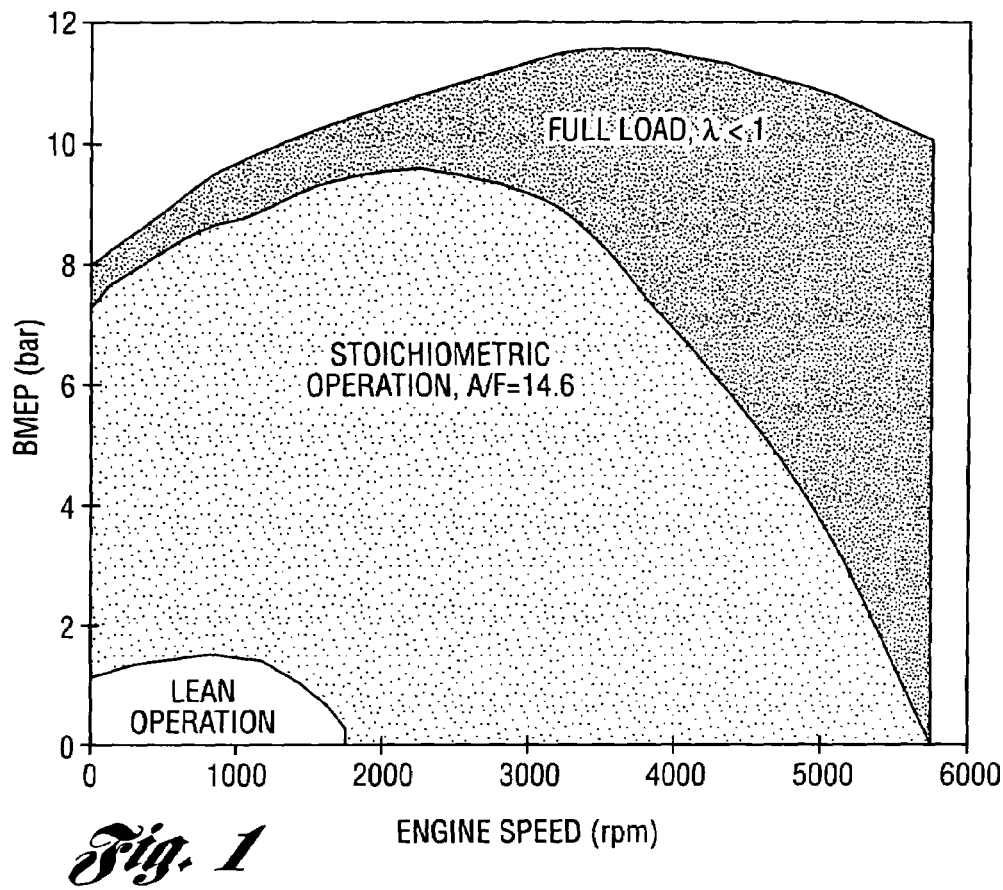
FIG. 1 is a graph of engine speed versus brake mean effective pressure (BMEP) at different air/fuel ratios for typical internal combustion engines and the proposed new stratified-charged engine.
Figure 2:
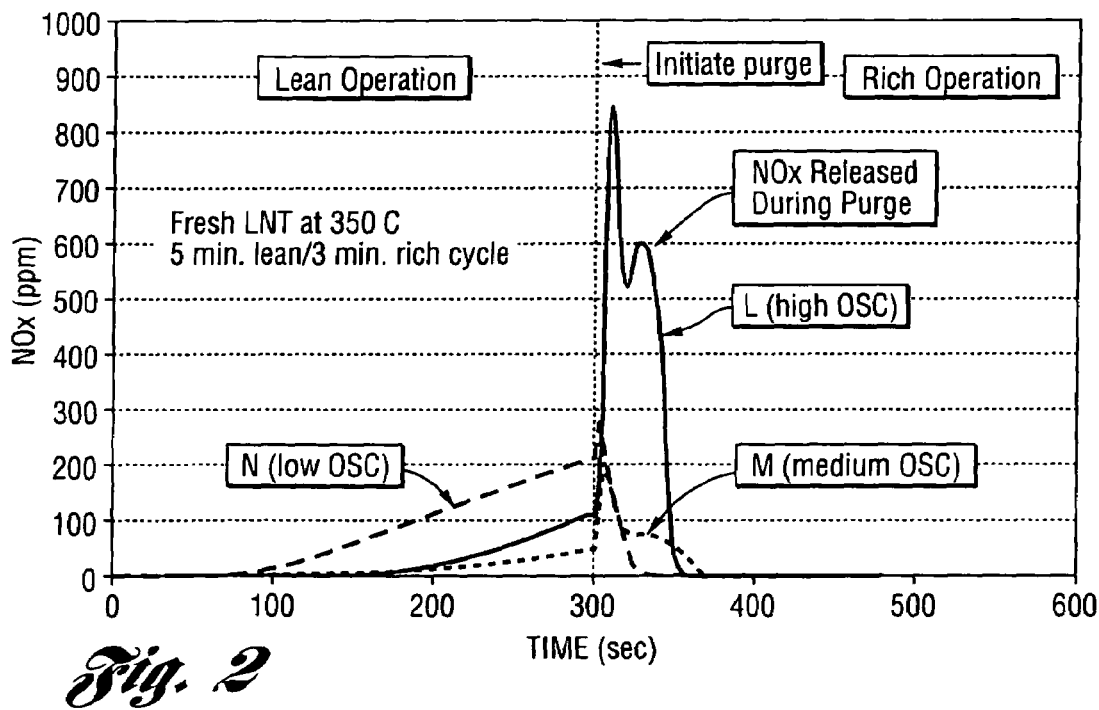
FIG. 2 is a graph of NOx released during the transition from lean-rich operation in milliseconds for three lean NOx traps with different oxygen storage capacities (OSC) in a flow reactor at 350° C.
Figure 5A:
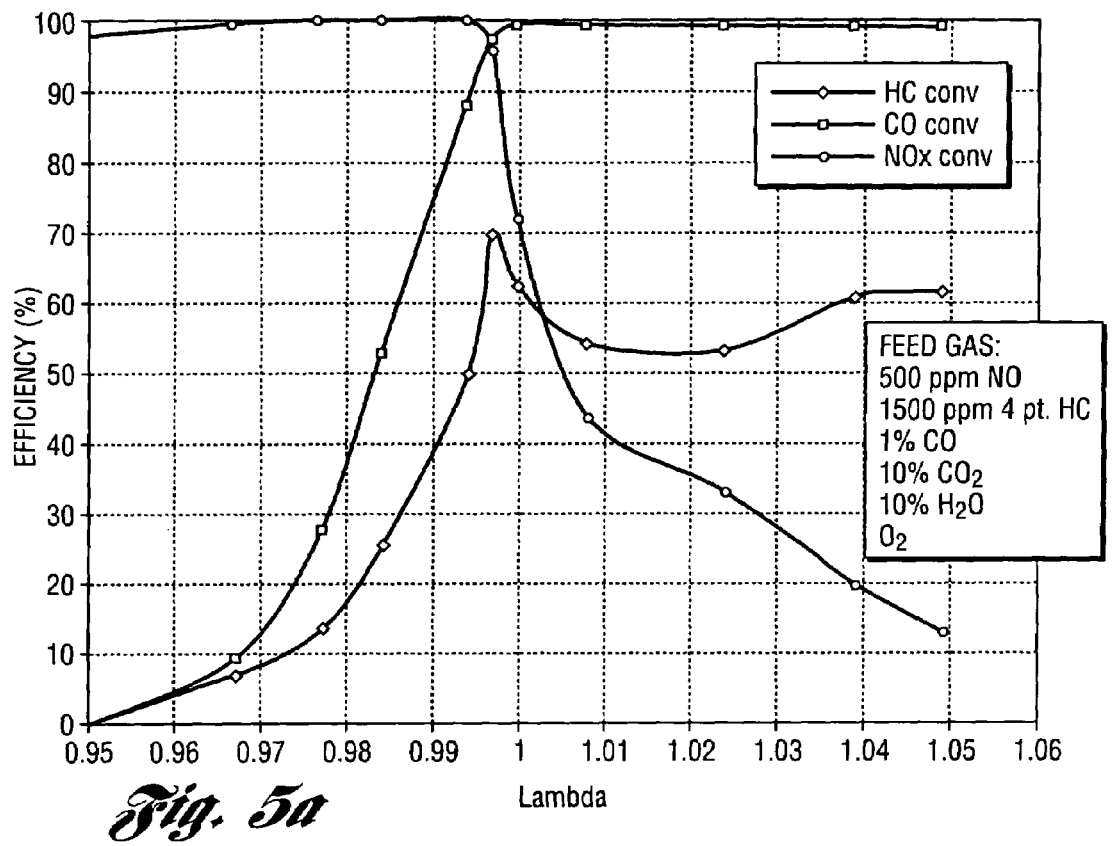
FIG. 5a shows the NOx trapping efficiency of the catalyst as prepared in Example 1.
Figure 5B:
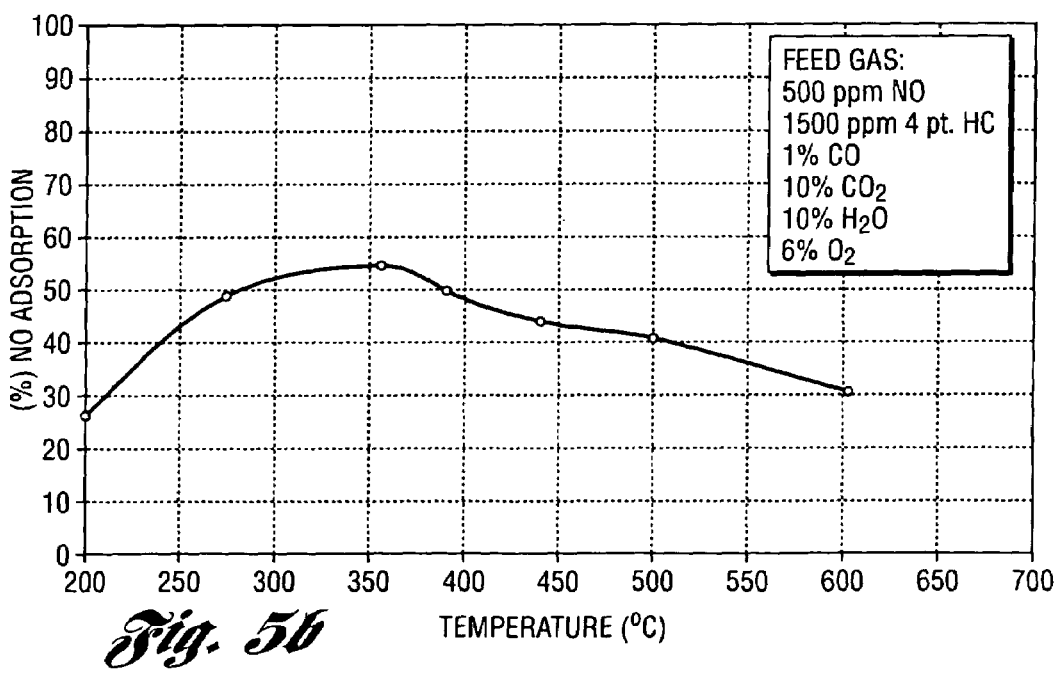
FIG. 5b shows the conversion efficiency of the catalyst as prepared in Example 1.

In one newer engine design, the engine is run under stoichiometric conditions most of the time, except under low load (brake mean effective pressure (BMEP)<1.2 bar), low engine speed (RPM<1750) conditions, when the engine is run under stratified-charged lean conditions, an air/fuel ratio of approximately 30. The operation diagram of a stratified charged (SC) engine is schematically shown as FIG. 1. FIG. 1 depicts the operation regions of typical internal combustion engines, homogeneously charged engines, with an air/fuel ratio=28, an engine operating under stoichiometric conditions, an air/fuel ratio of 14.6 and an engine operating at full load $\lambda<1$, wherein $\lambda$ is the air/fuel excess ratio. It is predicted that this engine operation would increase fuel economy by approximately 5%. For such engines, designed to operate at least partially under lean conditions, the present invention provides a catalyst system capable of reducing CO, HC, and NOx—in line with current and future emission standards.

As seen in FIG. 3, under this invention, one embodiment of the catalyst system 10 includes two closely-coupled catalysts—a forward catalyst 12 to maximize the reduction of engine 16 emissions under lean conditions and a downstream catalyst 14 to maximize the reduction of emissions under stoichiometric conditions. In particular, the forward catalyst 12 of this invention is comprised of a newly developed Perovskite composition designed to increase proximity between the precious metal and the NOx binding metals and to eliminate the oxygen storage capacity.

In general, Perovskites have the generic formula $ABO_3$. Perovskites can be classified into three categories according to the valence of the A and B elements: $A_1B_5O_3$, $A_2B_4O_3$, and $A_3B_3O_3$. A schematic crystal structure of a Perovskite, $CaTiO_3$, is shown in FIG. 4. As can be seen in FIG. 4, the B element is at the octahedral interstitial site at the center of the unit cell. As a result, B generally has a smaller ionic radius than A. In fact, an empirical tolerance factor defines the relationship between the ionic radius of A and the ionic radius of B: $T=(r_A+r_O)/1.4144(r_B+r_O)$, T must satisfy 0.75 less than T less than 1.00.

The active sites for a Perovskite are normally the B sites. For a reaction NO+CO to occur, the site should have balanced oxidation and reduction activity. Too strong an oxidation activity will drive CO immediately to $CO_2$ without involving NO, and too strong a reduction activity will drive NO to NOC or $N_2O$ without converting CO to $CO_2$. We have found that cobalt, Co, has this balanced oxidation/reduction property, and thus be placed on the B site. We have also found that lanthanum, La, at the A site provides adequate stability for the Perovskite. As a result, in this invention, the preferred parent Perovskite structure is $LaCoO_3$.

For NOx storing and releasing to occur, high capacity, fast storing and releasing kinetics is further required. This is accomplished by substituting barium, Ba, to the lanthanum, La, (A) sites to form $La_{1-x}Ba_xCoO_3$. Since lanthanum is trivalent while barium is divalent, the charge balance of the crystal structure results in the formation of either a tetravalent cobalt or positive holes (oxygen vacancies):

$$La^{3+}_{1-x}Ba^{2+}_xCo^{3+}_{1-x}Co^{4+}_xO_3$$

$$La^{3+}_{1-x}Ba^{2+}_xCo^{3+}O_{3-x/2}VO_{x/2}$$

By substituting barium with lanthanum, the oxygen vacancies created provide space for bulk nitrate or nitrite formation, to achieve NOx storage, and also accelerate the diffusion of nitrogen atoms inside the Perovskite structure.

For this invention, part of the lanthanum at the A site can also be substituted with magnesium, Mg, and potassium, K, to provide balanced trapping function at both low and high temperatures. Additionally, the lanthanum at the A site can be substituted with Sr.

In a preferred embodiment, the parent Perovskite structure $LaCoO_3$ can be modified, wherein cobalt is substituted at the B site with precious metals such as platinum and rhodium, or a transition metal such as iron, copper, and manganese—to increase the activity and selectivity of the Perovskite structure. The substituted metal, i.e., platinum, will thus have close proximity with barium at the molecular level which improves the thermal stability and NOx reducing capabilities of the forward catalyst 12, as shown in FIG. 3.

This newly developed Perovskite catalyst composition can generally be prepared according to a sol-gel method. The Perovskite composition can be coated onto a block of honeycomb cordierite substrate (600 csi). After the Perovskite is coated, extra platinum and rhodium can then be impregnated onto the coated substrate in a ratio of 7:1. The platinum and rhodium are loaded at approximately 20-100 g/ft³.

In one preferred embodiment, the Perovskite used as the forward catalyst has a formula of: $La_{0.5}Ba_{0.5}Co_{0.9}Pt_{0.1}O_3$. This preferred Perovskite composition can be prepared using a solution of citric acid and ethylene glycol. More specifically, 0.667 gm of citric acid and 4 cm³ of ethylene glycol per 1 gm of the final oxide mixture was added to a boiling solution of La, Ba, Co nitrates and tetra-amine platinum nitrate in the desired ratios. The resulting mixture is evaporated with vigorous stirring until formation of a gel, then further evaporated on a hot plate to remove the residual liquid. The resulting powder was ground and heated up to 300° C. for six hours, to remove the organic matter and then ground again and calcined at 900° C. for 30 hours in air.

Another preferred Perovskite composition has the formula:

$$La_{0.5}Ba_{0.5}Co_{0.9}Rh_{0.1}O_3$$

Yet another preferred Perovskite composition has the formula:

$$La_{0.5}Ba_{0.5}Co_{0.6}Fe_{0.3}Pt_{0.1}O_3$$

It should be noted that the above Perovskite structures can also be prepared using the co-precipitation method. Co-precipitation techniques are well known to those skilled in the art. According to such techniques, the soluble salts can be dissolved in a solvent, for example, nitrates of the metals are dissolved in water. Co-precipitation is then obtained by making the solution basic, e.g., a pH of 9 by adding a base like ammonium hydroxide. Other soluble metal compounds such as, for example, sulfates and chlorides, may be used as may mixtures or various soluble compounds, e.g., nitrates with chlorides. The precipitate would then be heated to decompose it to the mixed metal oxide. This heating and calcination can be carried out at temperatures of up to 900° C. It should be noted that the way in which the oxide is obtained for use in forming the catalyst is not critical to the invention. Still other ways and other soluble salts would be apparent to those skilled in the art in view of the present disclosure.

As is known in the art, for useful application of the catalyst in an exhaust gas system, the catalyst is deposited or washcoated on a substrate (mechanical carrier) made of a high temperature stable, electrically insulating material such as cordierite, mullite, etc. A mechanical carrier is preferably comprised of a monolithic magnesium aluminum silicate structure, i.e., cordierite, although the configuration is not critical to the catalyst of this invention.

It is preferred that the surface area of the monolithic structure provide 50-1000 meters square per liter structure, as measured by nitrogen adsorption. Cell density should be maximized consistent with pressure drop limitations and is preferable in the range of 200-800 cells per square inch of cross-sectional area of the structure. The substrate may be in any suitable configuration, often being employed as a monolithic honeycomb structure, spun fibers, corrugated configurations useful in this invention and suitable in an exhaust gas system will be apparent to those skilled in the art in view of the present disclosure.

Techniques for providing an oxide washcoat on a substrate are well known to those skilled in the art. Generally, a slurry of the mixed metal oxide particles and optionally stabilizer particles are coated on a substrate, e.g., added by dipping or spraying, after which the excess is generally blown off. After the slurry of mixed metal oxide particles are coated on the substrate, the substrate is heated to dry and calcine the coating, generally at a temperature of about 700° C. for about 2-3 hours. Calcining serves to develop the integrity of the ceramic structure of the washcoated oxide coating. The total amount of the oxide washcoat carried on the substrate is about 10-40% (wt), based on the weight of the substrate coated. Several coatings of the substrate and the washcoat may be necessary to develop the desired coating thickness/weight on the substrate.

For the downstream catalyst 14 of FIG. 3, the basic formulation is a catalyst that can include excess Ba compounds to stabilize the alumina carrier. Precious metals may also be provided on the calcined oxide coating by any technique including the well-known wet impregnation technique from soluble precious metal precursor compounds. Water soluble compounds are preferred, including, but not limited to nitrate salts and materials for platinum like chloroplatinic acid. As is known in the art, after impregnating the washcoat with the precursor solution, it is dried and heated to decompose the precursor to its precious metal or precious metal oxide. As is known in the art, the precursor may initially decompose to the metal but be oxidized to its oxide in the presence of oxygen. While some examples of precious metal precursors have been mentioned above, they are not meant to be limiting. Still other precursor compounds would be apparent to those skilled in the art in view of the present disclosure.

In addition to this incorporation from a liquid phase, the precious metal, such as platinum, may be provided by sublimation of platinum chloride or other volatile platinum salts, by a solid state exchange in the 300-500° C. temperature range using labile platinum compounds. There is no criticality to the type of precursor compounds that may be used to provide the precious metal according to this invention.

FIG. 3 depicts one embodiment of the catalyst system 10 of the present invention. As shown, the catalyst system 10 includes two catalysts 12, 14 in a close-coupled location. The forward catalyst 12 is optimized to function when the engine 16 is operated under lean conditions. The forward catalyst 12 will store excess NOx during lean operation and then release and convert the NOx when the engine 16 switches to stoichiometric or rich conditions. The downstream catalyst 14 is optimized to effectively convert HC, CO, and NOx under stoichiometric operations.

The forward catalyst 12 includes the newly developed Perovskite composite. By using this Perovskite composition, NOx emissions during lean conditions are reduced. This reduction is believed to be the result of the newly developed Perovskite composition which places the precious metal and NOx binding metals in close proximity.

The downstream catalyst 14 comprises a catalyst mixture PM-Rh, where PM (precious metal) is a catalyst material selected from the group consisting of platinum, palladium and combinations thereof and the PM is then mixed with Rh (rhodium) to form the downstream catalyst 14 catalyst mixture. This downstream catalyst 14 also preferably comprises an alumina substrate, on which the PM-Rh catalyst mixture is coated.

In a preferred embodiment, the downstream catalyst 14 contains platinum and rhodium, in a ratio of Pt/Rh 9:1, and more preferably 7:1. The total loading of the precious metal (PM) in the downstream catalyst 14 is, however, about 20-60 g/ft$^3$, and more preferably 40-60 g/ft$^3$, which results in a cost savings compared to these catalysts which have a precious metal loading of approximately 100-120 g/ft$^3$. In this preferred embodiment, both Pt and Rh are anchored on 2-20% (wt) high surface area Ce/Zr with high $O_2$ kinetics (e.g., Ce/Zr=50:50 molar ratio). The alumina washcoat is preferably also stabilized by 2-20% BaO.

The foregoing catalyst system 10 eliminates the oxygen storage function of the forward catalyst 12, which is normally present in lean NOx trap formulations, so that NOx breakthrough is minimized. The forward catalyst 12 can be purged and NOx converted when an engine control module (ECM) senses that the engine is under high or low load, corresponding to acceleration or deceleration, respectively.

Optionally, an exhaust gas oxygen sensor 18 is positioned upstream of the downstream catalyst 14 between catalyst 12 and catalyst 14, as shown in FIG. 3. Under this arrangement, there is no fuel economy penalty from the offset of the oxygen storage capacity of the forward catalyst because we have eliminated the oxygen storage capacity in the forward catalyst.

This catalyst system is expected to be used in automotive vehicles for emission treatment in the exhaust gas system where it functions to oxidize hydrocarbons, carbon monoxide, and simultaneously reduce nitrogen oxides to desired emission levels.

One alternative embodiment of this invention uses just the Perovskite forward catalyst 12 to reduce emissions from the exhaust streams of such two-cylinder machines/devices as boats, jet skis, lawn mowers or cutting devices to provide a low cost catalyst. Under this embodiment, the Perovskite catalyst would be coated directly on the exhaust emitting component of the device, i.e., a muffler, or alternatively coated on an inexpensive substrate, such as ceramic. To ensure that the catalyst remains low cost, the cobalt B cation sites on the Perovskite crystal structure would be substituted with a metal selected from the group consisting of iron, copper and manganese—not a precious metal. It should be noted that for such Perovskite applications, low sulfur content fuel is preferred to avoid sulfur poisoning of the Perovskite catalyst.

EXAMPLE 1

$La(NO_3)_3.6H_2O$ (108.25 g), $Ba(NO_3)_2$ (65.34 g), $Co(NO_3)_2.6H_2O$ (130.97 g), and $Pt(NH_3)_4(NO_3)_2$ (19.35 g) are each added to 500 ml deionized water, heated to 100° C., and then mixed together to achieve a solution with the final desired ratios. This stirred solution is heated and allowed to boil before adding a solution containing 0.667 g of citric acid and 4 cm$^3$ of ethylene glycol per 1 g of the final oxide mixture. The resulting mixture is evaporated with vigorous stirring until formation of a gel, and then further evaporated on a hot plate at 140° C. to remove the residual liquid. The resulting powder is ground and heated to 300° C. for 6 hours and allowed to cool to room temperature. The powder is ground again and then calcined in air at 900° C. for 30 hours. The final powder composition is $La_{0.5}Ba_{0.5}Co_{0.9}Pt_{0.1}O_3$.

EXAMPLE 2

The sample is prepared by the same method as described in Example 1 with the exception of adding 16.25 g of $Rh(NO_3)_3.2H_2O$ to 500 ml deionized water instead of $Pt(NH_3)_4(NO_3)_2$. The resulting powder is $La_{0.5}Ba_{0.5}Co_{0.9}Rh_{0.1}O_3$.

EXAMPLE 3

$La(NO_3)_3.6H_2O$ (108.25 g), $Ba(NO_3)_2$ (65.34 g), $Co(NO_3)_2.6H_2O$ (87.31 g), $Fe(NO_3)_3.9H_2O$ (60.60 g), and $Pt(NH_3)_4(NO_3)_2$ (19.35 g) are each added to 500 ml deionized water, heated to 100° C., and then mixed together to achieve a solution with the final desired ratios. This stirred solution is heated and allowed to boil before adding a solution containing 0.667 g of citric acid and 4 cm$^3$ of ethylene glycol per 1 gm of the final oxide mixture. The resulting mixture is evaporated with vigorous stirring until formation of a gel, and then further evaporated on a hot plate at 140° C. to remove the residual liquid. The resulting powder is ground and heated to 300° C. for 6 hours and allowed to cool to room temperature. The powder is ground again and then calcined in air at 900° C. for 30 hours. The final powder composition is $La_{0.5}Ba_{0.5}Co_{0.6}Fe_{0.3}Pt_{0.1}O_3$.

The foregoing catalyst systems constructions and compositions have been found useful in reducing harmful engine emissions. Variations and modifications of the present invention may be made without departing from the spirit and scope of the invention or the following claims.

What is claimed:

1. A method of reducing emissions from an exhaust gas stream comprising:

providing a first catalyst for optimizing the storage of $NO_x$ emissions under lean air/fuel ratios, comprising a Perovskite-type $ABO_3$ crystal structure wherein the A cation sites are occupied by lanthanide ions and the B cation sites are occupied by cobalt ions, wherein from about 1 to up to 70% of the lanthanide A cation sites are substituted with a $NO_x$ trapping metal selected from the group consisting of barium, magnesium and potassium to result in a charge balanced crystal structure that forms oxygen vacancies to promote $NO_x$ storage, wherein from about 1 to up to 60% of the cobalt B cation sites are substituted with a metal selected from the group consisting of platinum, rhodium, iron, copper and manganese;

providing a second catalyst for optimizing the reduction of hydrocarbon, $NO_x$ and CO emissions under stoichiometric air/fuel ratios comprising a catalyst mixture PM-Rh wherein PM is a catalyst material selected from the group consisting of platinum, palladium and combinations thereof wherein the first and second catalysts are closely coupled, the first catalyst being placed in a forward position and the second catalyst being placed in a downstream position in the exhaust stream; and wherein the first catalyst has the formula $La_{0.5}Ba_{0.5}CO_{0.9}Rh_{0.1}O_3$.

2. A method of reducing emissions from an exhaust gas stream comprising:

providing a first catalyst for optimizing the storage of $NO_x$ emissions under lean air/fuel ratios, comprising a Perovskite-type $ABO_3$ crystal structure wherein the A cation sites are occupied by lanthanide ions and the B cation sites are occupied by cobalt ions, wherein from about 1 to up to 70% of the lanthanide A cation sites are substituted with a $NO_x$ trapping metal selected from the group consisting of barium, magnesium and potassium to result in a charge balanced crystal structure that forms oxygen vacancies to promote $NO_x$ storage, wherein from about 1 to up to 60% of the cobalt B cation sites are substituted with a metal selected from the group consisting of platinum, rhodium, iron, copper and manganese;

providing a second catalyst for optimizing the reduction of hydrocarbon, $NO_x$ and CO emissions under stoichiometric air/fuel ratios comprising a catalyst mixture PM-Rh wherein PM is a catalyst material selected from the group consisting of platinum, palladium and combinations thereof wherein the first and second catalysts are closely coupled, the first catalyst being placed in a forward position and the second catalyst being placed in a downstream position in the exhaust stream; and wherein the first catalyst has the formula $La_{0.5}Ba_{0.5}CO_{0.9}Rh_{0.1}O_3$.

3. A method of reducing emissions from an exhaust gas stream comprising:

providing a first catalyst for optimizing the storage of $NO_x$ emissions under lean air/fuel ratios, comprising a Perovskite-type $ABO_3$ crystal structure wherein the A cation sites are occupied by lanthanide ions and the B cation sites are occupied by cobalt ions, wherein from about 1 to up to 70% of the lanthanide A cation sites are substituted with a $NO_x$ trapping metal selected from the group consisting of barium, magnesium and potassium to result in a charge balanced crystal structure that forms oxygen vacancies to promote $NO_x$ storage, wherein from about 1 to up to 60% of the cobalt B cation sites are substituted with a metal selected from the group consisting of platinum, rhodium, iron, copper and manganese;

providing a second catalyst for optimizing the reduction of hydrocarbon, $NO_x$ and CO emissions under stoichiometric air/fuel ratios comprising a catalyst mixture PM-Rh wherein PM is a catalyst material selected from the group consisting of platinum, palladium and combinations thereof wherein the first and second catalysts are closely coupled, the first catalyst being placed in a forward position and the second catalyst being placed in a downstream position in the exhaust stream; and wherein the first catalyst has the formula $La_{0.5}Ba_{0.5}CO_{0.9}Rh_{0.1}O_3$.

4. A method of reducing emissions from an exhaust gas stream comprising:

providing a first catalyst for optimizing the storage of $NO_x$ emissions under lean air/fuel ratios, comprising a Perovskite-type $ABO_3$ crystal structure wherein the A cation sites are occupied by lanthanide ions and the B cation sites are occupied by cobalt ions, wherein from about 1 to up to 70% of the lanthanide A cation sites are substituted with a $NO_x$ trapping metal selected from the group consisting of barium, magnesium and potassium to result in a charge balanced crystal structure that forms oxygen vacancies to promote $NO_x$ storage, wherein from about 1 to up to 60% of the cobalt B cation sites are substituted with a metal selected from the group consisting of platinum, rhodium, iron, copper and manganese;

providing a second catalyst for optimizing the reduction of hydrocarbon, $NO_x$ and CO emissions under stoichiometric air/fuel ratios comprising a catalyst mixture PM-Rh wherein PM is a catalyst material selected from the group consisting of platinum, palladium and combinations thereof wherein the first and second catalysts are closely coupled, the first catalyst being placed in a forward position and the second catalyst being placed in a downstream position in the exhaust stream; and wherein the first catalyst has a formula selected from the group consisting of $La_{0.5}Ba_{0.5}CO_{0.9}Rh_{0.1}O_3$, $La_{0.5}Ba_{0.5}Co_{0.6}Fe_{0.3}Pt_{0.1}O_3$, and $La_{0.5}Ba_{0.5}CO_{0.9}Pt_{0.1}O_3$.

* * * * *